United States Patent [19]
Nishiguchi et al.

[11] Patent Number: 4,825,684
[45] Date of Patent: May 2, 1989

[54] METHOD OF TESTING SEMICONDUCTOR PRESSURE SENSOR

[75] Inventors: Masanori Nishiguchi, Kanagawa; Ichiro Sogawa; Katsuyoshi Sunago, both of Osaka, all of Japan

[73] Assignee: Sumitomo Electric Industries, Ltd., Osaka, Japan

[21] Appl. No.: 110,863

[22] Filed: Oct. 21, 1987

[30] Foreign Application Priority Data

Oct. 28, 1986 [JP] Japan ............................. 61-257977
Oct. 28, 1986 [JP] Japan ............................. 61-257976

[51] Int. Cl.⁴ ............................................. G01L 27/00
[52] U.S. Cl. .................................................... 73/4 R
[58] Field of Search ................. 73/865.8, 865.9, 866.1, 73/4 R, DIG. 4; 29/593, 705, 610 SG

[56] References Cited

U.S. PATENT DOCUMENTS

| 1,302,028 | 4/1919 | Fuchs et al. |
| 3,224,106 | 12/1965 | Way |
| 3,608,946 | 9/1971 | Erickson et al. |
| 3,899,766 | 8/1975 | Mermelstein |
| 4,050,729 | 9/1977 | Hutson |
| 4,173,148 | 11/1979 | Yamada et al. |
| 4,174,639 | 11/1979 | Raven |
| 4,182,158 | 1/1980 | Culotta et al. ............ 73/4 R |
| 4,345,477 | 8/1982 | Johnson ............... 338/22 SD |
| 4,411,158 | 10/1983 | Schaff, Jr. |
| 4,565,097 | 1/1986 | Dimeff |
| 4,611,129 | 9/1986 | Ishihara |
| 4,618,178 | 10/1986 | Hutson et al. |
| 4,658,829 | 4/1987 | Wallace ................... 73/4 R |
| 4,708,012 | 11/1987 | Folk et al. ................. 73/4 R |

FOREIGN PATENT DOCUMENTS

| 2628488 | 1/1978 | Fed. Rep. of Germany |
| 2631502 | 1/1978 | Fed. Rep. of Germany |
| 33678 | 3/1979 | Japan |
| 0107142 | 8/1981 | Japan ...................... 73/4 R |
| 0647569 | 2/1979 | U.S.S.R. .................. 73/4 R |
| 0657291 | 4/1979 | U.S.S.R. .................. 73/4 R |

Primary Examiner—Michael J. Tokar
Assistant Examiner—Robert R. Raevis
Attorney, Agent, or Firm—Cushman, Darby & Cushman

[57] ABSTRACT

A method of measuring a semiconductor pressure sensor comprises the steps of mounting a wafer formed with diaphragm type semiconductor pressure sensors on a wafer stage, evacuating air existing between the back surface side of said diaphragm type semiconductor pressure sensors and said wafer stage through at least one hole provided in said wafer stage to deform diaphragms of said semiconductor pressure sensors, and measuring the pressure sensitivity of each of said semiconductor pressure sensors from the surface side of said semiconductor pressure sensors.

7 Claims, 2 Drawing Sheets

METHOD OF TESTING SEMICONDUCTOR PRESSURE SENSOR

BACKGROUND OF THE INVENTION

The present invention relates to a method of testing a semiconductor pressure sensor and more specifically to a method of testing the pressure sensitivity of a diaphragm type semiconductor pressure sensor typical of a semiconductor pressure sensor fitted to the tip of a catheter for medical use.

When a mechanical stress is applied to a semiconductor made of a silicon or the like, its resistance changes greatly because of the piezoelectric resistance effect and the perception of this fact has led to the development of a semiconductor pressure sensor. The process of making such a semiconductor pressure sensor comprises the steps of forming strain gauge resistors formed by diffusion of impurity ions on the surface layer of a silicon single crystal, assembling four of the strain gauge resistors into a Wheatstone bridge, forming a recess in the back surface of the silicon single crystal to use a thin portion thereof as a diaphragm, and disposing pads in suitable places on the front surface except for the diaphragm. When pressure is applied to the semiconductor pressure sensor, the diaphragm is deformed and the resistance value of the strain gauge resistor changes to a greater extent because of the piezoelectric resistance effect, so that a bridge output proportional to the pressure is obtainable.

The aforesaid semiconductor pressure sensor is extremely small in size and, particularly in the case of a semiconductor pressure sensor for medical use, a plurality of semiconductor pressure sensors are fitted on the tip of a catheter and inserted into a body. Accordingly, even in a semiconductor pressure sensor incorporating peripheral circuits such as a temperature compensating circuit, a pressure sensitivity compensating circuit and the like, a side of a chip should be about 1 mm or smaller in length.

It is therefore extremely difficult to measure the bridge output by applying pressure to the diaphragm from the surface of the semiconductor pressure sensor and simultaneously make the electrode of the semiconductor pressure sensor contact the measuring probe.

The conventional testing method for a semiconductor pressure sensor under the wafer process comprises mounting a wafer of the semiconductor pressure sensor on a wafer stage and making the electrodes built in the surface of the wafer contact a measuring probe without applying pressure so that only electrical measurement is effected.

In the aforesaid method, however, no testing is made when pressure is being applied to the diaphragm. Further, the thickness of the diaphragm formed in each semiconductor pressure sensor through the process of ion implantation, diffusion, epitaxial growth, etching etc. lacks uniformity, so that the degree of the deformation of each diaphragm against the actually applied pressure is slightly different from each other. As a result, accurate measurement cannot be carried out. Since the chip size is small, it is practically impossible to measure the pressure sensitivity by applying pressure to each chip after the wafer is cut out in order to prevent such variation in deformation. Accordingly, the sensor has to be used with allowance for the aforesaid variation. Although it is considered that the pressure sensitivity is measured after the chip is cut out of the water, those chips that do not have a desired pressure sensitivity, together with the chip, must be discarded. It simply means a waste of labor and cost.

SUMMARY OF THE INVENTION

In view of the aforesaid problems, an object of the present invention is to provide a method of testing a semiconductor pressure sensor under the wafer process so that the measurement of the pressure sensitivity of the semiconductor pressure sensor can be easily conducted irrespectively of the chip size.

In order to accomplish the aforesaid object, the method of testing a semiconductor pressure sensor according to the present invention comprises the steps of boring at least one evacuating hole in a wafer stage, evacuating air existing between the back surface side of a diaphragm type semiconductor pressure sensor and the wafer stage through the hole to deform the diaphragm, and measuring the pressure sensitivity of the semiconductor pressure sensor from the surface side of the semiconductor pressure sensor.

An intermediate member made of porous material may be held between the back surface side of the diaphragm type semiconductor pressure sensors and the wafer stage provided with the evacuating holes to deform all diaphragms facing the intermediate member by making vacuum suction to the semiconductor pressure sensors simultaneously through the holes.

In the aforesaid method of measuring a semiconductor pressure sensor, the wafer is mounted on the wafer stage and the diaphragm is subjected to vacuum suction from the back surface side of the semiconductor pressure sensor by making use of the hole bored in the wafer stage, whereby the diaphragm is subjected to negative pressure and deformed. The electrical output of the semiconductor pressure sensor with the diaphragm thus deformed, i.e., the pressure sensitivity of the semiconductor pressure sensor can be measured using the electrodes formed on the surface thereof.

Namely, the negative pressure equivalent to the pressure applied to the surface of the diaphragm is generated through the vacuum suction of the diaphragm at the back surface side and the electrical output is measured, whereby the pressure sensitivity of the semiconductor pressure sensor can be measured under the wafer process.

Further, in the method of measuring a semiconductor pressure sensor according to the present invention, the back surface of the wafer is subjected to vacuum suction through the intermediate member made of porous material by utilizing a plurality of holes bored in the wafer stage to deform all diaphragms formed in the semiconductor pressure sensors opposite to the intermediate member by the negative pressure, whereby the electrical output of the semiconductor pressure sensor in that deformed state, i.e., the pressure sensitivity of the semiconductor pressure sensor can be measured from the surface side of the wafer by means of the measuring probe.

DETAILED DESCRIPTION OF THE PREFERRED EMBODIMENTS

Referring now to the accompanying drawings, embodiments of the present invention will be described in detail.

Figure 2A:
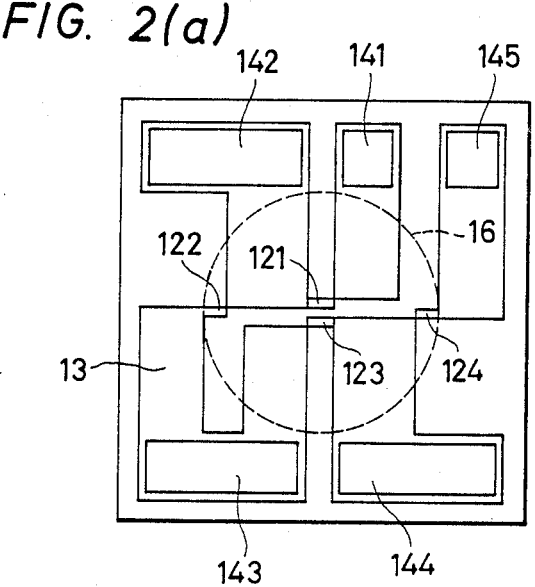
FIGS. 2(a) and 2(b) are top and elevational sectional views of the semiconductor pressure sensor, respectively.
Figure 2B:
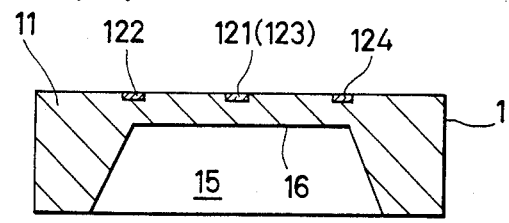

FIGS. 2(a) and 2(b) show a semiconductor pressure sensor 1 which is small with a thickness of about 400 μm. Strain gauge resistors 121, 122, 123, 124 are formed by diffusion in the surface layer of a silicon monocrystal 11 and the four strain gauge resistors are connected in series with a diffused lead part 13 which communicates with aluminum (hereinafter Al pads) pads 141, 142, 143, 144 and 145. A recess 15 is formed in the back surface of the silicon single crystal 11 and the thin portion thereof (having a thickness less than 30 μm) used as a diaphragm 16.

Figure 1:
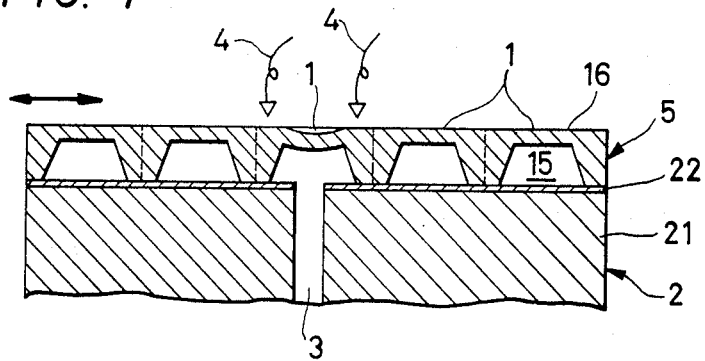
FIG. 1 is a schematic sectional view showing a method of measuring a semiconductor pressure sensor according to a first embodiment of the present invention.

FIG. 1 is a schematic sectional view showing, a method of measuring a semiconductor pressure sensor according to a first embodiment of the present invention, wherein a wafer stage 2 has a vacuum leakage preventing seal material 22 of soft synthetic resin (for example, styrene, butadiene or silicone rubber) with a thickness in order of 10 μm, which is formed on a plate material 21 of stainless or synthetic resin. Moreover, at least one through-hole 3 is bored in a suitable place of the wafer stage 2 to make vacuum suction to the recess 15 of the semiconductor pressure sensor 1.

A measuring probe 4 is located above the through-hole 3 and the recess 15 of the semiconductor pressure sensor 1 and also located above the through-hole 3. The measuring probe contracts the Al pads 141, 145 and the Al pad 143 (across the input terminal of a bridge), and the Al pad 142 and the Al pad 141 (across the output terminal of the bridge).

In order to locate the recess 15 of the semiconductor pressure sensor 1 formed in a wafer 5 between the through-hole 3 of the wafer stage 2 and the measuring probe 4, the wafer 5 may be moved while the wafer stage 2 and the measuring probe 4 are set still or the wafer stage 2 and the measuring probe 4 may be shifted while the wafer 5 is set still.

When the pressure sensitivity is measured by moving the wafer 5 relative to the wafer stage 2, only one through-hole 3 may be formed in the wafer stage 2. When as many through-holes 3 as semiconductor pressure sensors 1 formed in the wafer 5 are formed, the number of measuring probes is to be increased and, although the measuring circuit is complicated, measuring time can be shortened because the relative movement of the wafer is unnecessitated.

Accordingly, a proper number of through-holes 3 are bored in the wafer stage 2 to the extent that the number of through-holes 3 is not more than that of the semiconductor sensors formed in the wafer 5 so that the aforesaid measuring circuit and the number of measurement are optimized.

As set forth above, the wafer 5 is mounted on the wafer stage 2 and the recess 15 formed in the back surface of the semiconductor pressure sensor 1 is subjected to vacuum suction through the through-hole 3. The sealing material 22 on the wafer stage 2 prevents vacuum leakage from the connection portion between the silicon monocrystal 11 and the wafer stage 2. The diaphragm 16 is then deformed as in the case where it receives pressure from its surface side so that the pressure sensitivity can be measured, because the negative pressure equivalent to what is applied from its surface side is generated in the recess 15 of the semiconductor pressure sensor 1.

Figure 3:
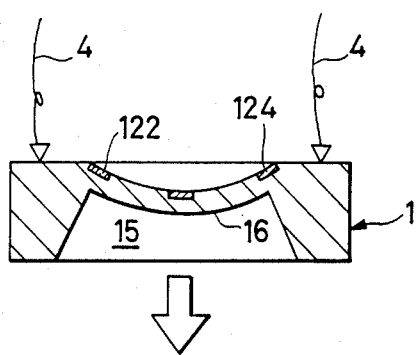
FIG. 3 is a diagram showing a stage wherein pressure has been applied to the semiconductor pressure sensor.
Figure 4:
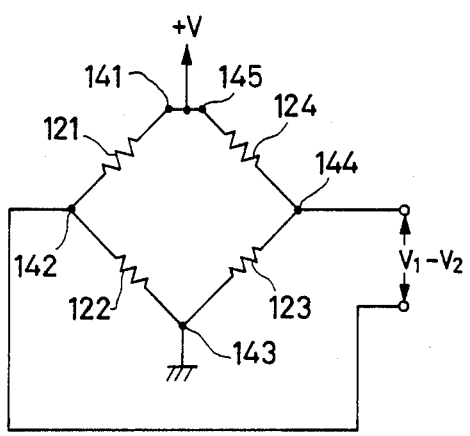
FIG. 4 is an electric circuit diagram showing an electrical arrangement in the semiconductor pressure sensor.

FIG. 3 shows a state wherein the diaphragm 16 has been deformed. The strain gauge resistors 121, 123 diffused in the center of the diaphragm out of the four strain gauge resistors 121, 122, 123 and 124 constituting a bridge circuit shown in FIG. 4 are compressed as the diaphragm 16 deforms and the strain gauge resistors 122, 124 diffused on the periphery of the diaphragm 16 are extended as the diaphragm 16 deforms.

With respect to the strain gauge resistors, use is made of those whose resistance value increases proportionally to the stress. Given the resistance values of the strain gauge resistors 121, 122, 123 and 124 respectively at R1, R2, R3 and R4, R2 and R4 increases whereas R1 and R3 decreases as the diaphragm 16 deforms. In other words, the potential $V_1$ across the terminals of R2 increases, whereas the potential $V_2$ across the terminals of R3 decreases.

Accordingly, the bridge output, i.e., $V_1-V_2$ increases in proportion to the deformation of the diaphragm 16.

The pressure sensitivity of the semiconductor pressure sensor 1 can simply be tested irrespective of the chip size, before the wafer 5 is cut out on a chip basis, by measuring the bridge output with the measuring probe 4 using the Al pads of the semiconductor pressure sensor 1.

In a brief summary, the electrical measurement is made from the surface side of the semiconductor pressure sensor 1 and the pressure is applied from the back surface side thereof, whereby the pressure sensitivity of the semiconductor pressure sensor 1 is tested under the wafer process.

Figure 5:
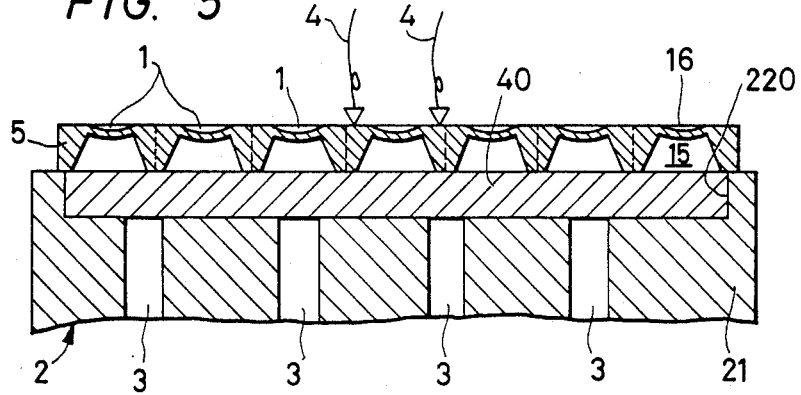
FIG. 5 is a schematic sectional view showing a method of measuring a semiconductor pressure sensor according to a second embodiment of the present invention.

FIG. 5 is a schematic sectional view showing a method of measuring a semiconductor pressure sensor according to a second embodiment of the present invention, wherein like reference characters designate like members of FIG. 1. The wafer stage 2 is constructed of a plate material 21 of stainless or synthetic resin and made slightly wider than the bottom surface of a wafer 5. A recess 220 slightly smaller than the bottom surface of the wafer 5 is formed in the surface of the wafer stage 2 and an intermediate member 40 is installed in the recess 220, whereas at least one evacuating through-hole 3 is bored in the bottom surface of the recess 220.

The intermediate member 40 installed in the recess 220 is made of porous material (for example, a foamed metal or glass material or hard foamed material such as polystyrene).

The wafer 5 is mounted on the intermediate member 40 installed on the wafer stage 2 and vacuum-sucked through the through-hole 3 so that the through-hole 3 and the back surface of the wafer 5 are communicated with each other because of the pores of the intermediate member 40. Accordingly, negative pressure is uniformly generated over the whole back surface of the wafer 5.

Consequently, the negative pressure applied to the recesses 15 of all semiconductor sensors 1 formed in the wafer 5 is substantially made uniform. The diaphragms 16 formed in all semiconductor pressure sensors can be deformed as in the case where they are subjected to pressure from their surface side and, by making the measuring probe 4 contact the Al pads 144, 145 and the Al pad 143 (across the input terminal of a bridge), and the Al pad 142 and the Al pad 144 (across the output terminal of the bridge), electrical power can be supplied to the bridge and its output (pressure sensitivity) can be measured.

The present invention is not limited to the aforesaid embodiments. For example, the installation of the measuring probe 4 at a position corresponding to each Al pad of all semiconductor pressure sensors formed in the wafer 5 make it possible to measure all semiconductor pressure sensors at once. Although the invention has been described in its preferred form, it is understood that the combination and arrangement of parts may be altered without departing from the spirit and the scope of the invention as hereinafter claimed.

As set forth above, in the method of measuring a semiconductor pressure sensor according to the first embodiment of the present invention, the negative pressure corresponding to the pressure applied to the surface of the diaphragm is produced at the back side of the diaphragm to deform the diaphragm of the semiconductor pressure sensor. This is done by using of the evacuating hole bored in the wafer stage. By measuring the electrical output in this state, the pressure sensitivity of the semiconductor pressure sensor can be measured under the wafer process, whereby the measuring process for a semiconductor pressure sensor is simplified with the effect of reducing production costs.

Further, in the method of testing a semiconductor pressure sensor according to the second embodiment of the present invention, the negative pressure corresponding to the pressure applied to the surface of the diaphragm can be produced substantially uniformly over all diaphragms of the semiconductor pressure sensors by using the porous intermediate member. Since the pressure sensitivity thereof can be tested by the measuring probe in the aforesaid state, the wafer need not be moved relatively to the wafer stage, whereby the measuring process for a semiconductor pressure sensor is simplified with the effect of reducing production costs.

What is claimed is:

1. A method of testing a semiconductor pressure sensor, comprising the steps of:
   mounting a wafer on a wafer stage having at least one hole therein, said wafer having a plurality of diaphragm type semiconductor pressure sensors therein, each said sensor having a back surface and a front surface, said wafer being mounted so that the back surface of at least one pressure sensor is directly above at least one hole in said wafer stage;
   evacuating air existing between the back surface of said sensor through said hole provided in said wafer stage to deform the diaphragm of said sensor;
   measuring the electrical output of said semiconductor pressure sensor from the front surface of said semiconductor pressure sensor; and
   calculating the pressure sensitivity from said electrical output.

2. A method of testing a semiconductor pressure sensor as claimed in claim 1, wherein the pressure sensitivity of each of said semiconductor pressure sensors is sequentially measured by moving said wafer on said wafer stage.

3. A method of testing a semiconductor pressure sensor as claimed in claim 1, wherein said wafer stage comprises a plate material selected from the group consisting of stainless resin and synthetic resin and a sealing material for preventing vacuum leakage.

4. A method of testing a semiconductor pressure sensor as claimed in claim 3, wherein said seal material is made of styrene, butadiene or silicone rubber.

5. A method of testing a semiconductor pressure sensor as claimed in claim 1, wherein said air is evacuated through an intermediate member made of porous material provided between the back surface side of said diaphragm type semiconductor pressure sensors and said wafer stage provided with said at least one hole to deform all diaphragms facing said intermediate member simultaneously.

6. A method of testing a semiconductor pressure sensor as claimed in claim 5, wherein the electrical output of said semiconductor sensor is measured by using measuring probes for scanning said wafer.

7. A method of testing a semiconductor pressure sensor as claimed in claim 5, wherein said intermediate member is made of foamed metal, foamed glass or hard foamed material.

* * * * *